United States Patent [19]

Phillips

[11] 3,906,520
[45] Sept. 16, 1975

[54] APPARATUS FOR PRODUCING A HIGH CONTRAST VISIBLE IMAGE FROM AN OBJECT

[75] Inventor: Brian G. Phillips, Cupertino, Calif.

[73] Assignee: Optics Technology, Inc., Redwood City, Calif.

[22] Filed: Aug. 3, 1973

[21] Appl. No.: 385,627

[52] U.S. Cl. .................................. 354/62; 350/96 B
[51] Int. Cl.² ..................... G03B 29/00; G02B 5/16
[58] Field of Search ..................... 350/96 B; 356/71; 340/146.3 E; 354/62

[56] References Cited
UNITED STATES PATENTS

| | | | |
|---|---|---|---|
| 3,482,498 | 9/1969 | Becker | 340/146.3 E |
| 3,527,535 | 9/1970 | Monroe | 356/71 |
| 3,648,240 | 3/1972 | Jacoby et al. | 340/146.3 E |
| 3,668,633 | 6/1972 | Sadowsky | 340/146.3 E |

FOREIGN PATENTS OR APPLICATIONS

| | | | |
|---|---|---|---|
| 1,279,317 | 11/1961 | France | 356/71 |

*Primary Examiner*—Ronald L. Wibert
*Assistant Examiner*—F. L. Evans
*Attorney, Agent, or Firm*—Townsend and Townsend

[57] ABSTRACT

A fibre-optic imaging block for producing a high contrast, visible image of an object. A common light entry/exit face of the block is illuminated with light which is totally internally reflected interior of the individual block fibres toward an opposing partially cylindrical angular objective surface. When the object is placed on the objective surface of the block, a high contrast visible image is produced over the entire imaging angle defined by the sector angle of the objective surface. A complementary correction slug eliminates compound distortions introduced by the objective surface configuration. In an alternate embodiment of the imaging block, field distortions are eliminated by forming the individual fibre ends tangent to the objective surface, and a special correction slug is provided for optionally eliminating inclined plane and line curvature distortions. A finger printing system employs the imaging block in combination with a flash lamp and means for viewing the finger print image before recording on film.

21 Claims, 18 Drawing Figures

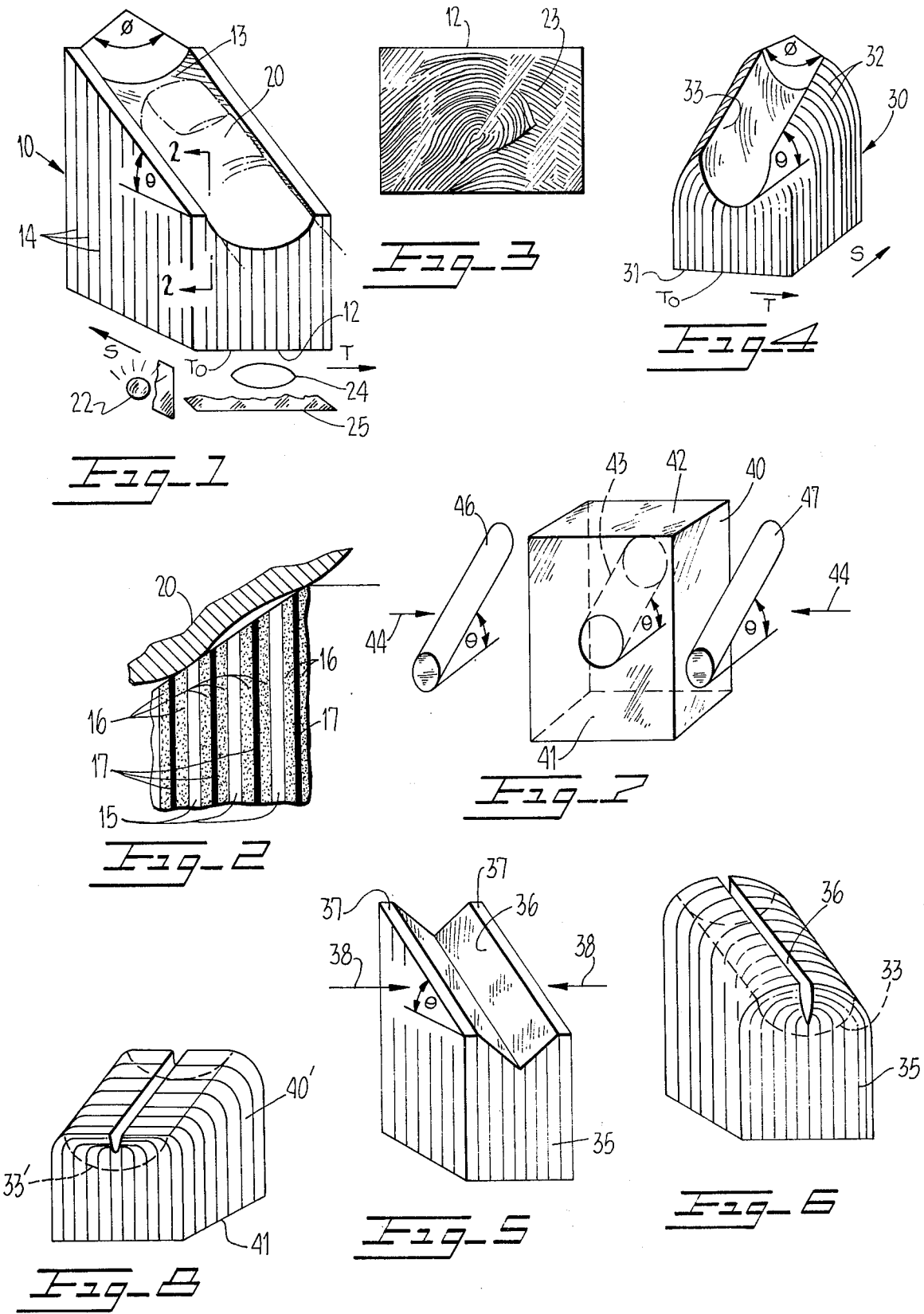

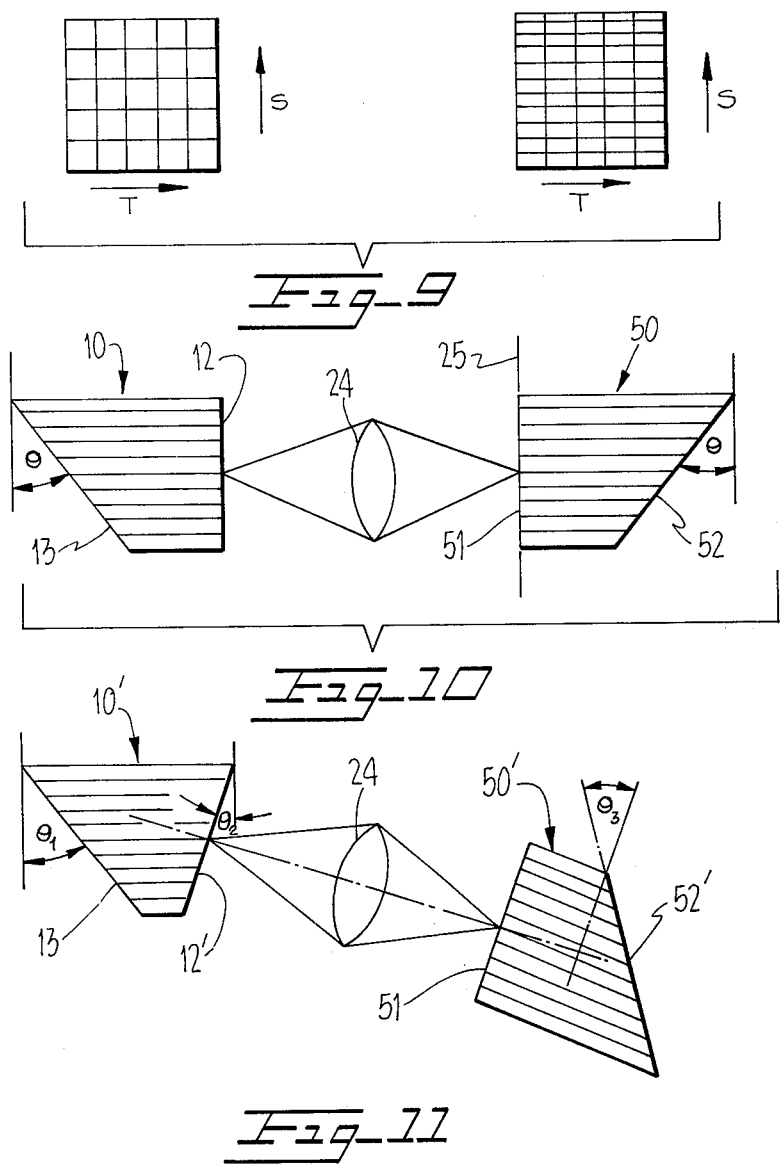
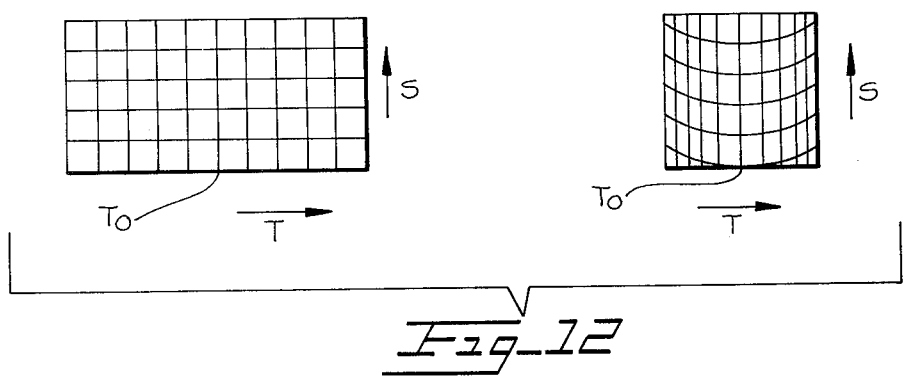

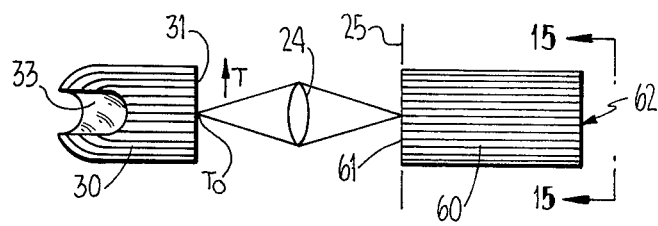 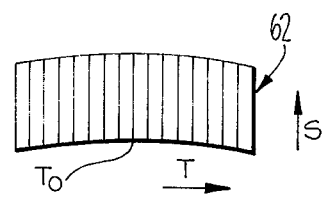
*Fig_15*  *Fig_16*
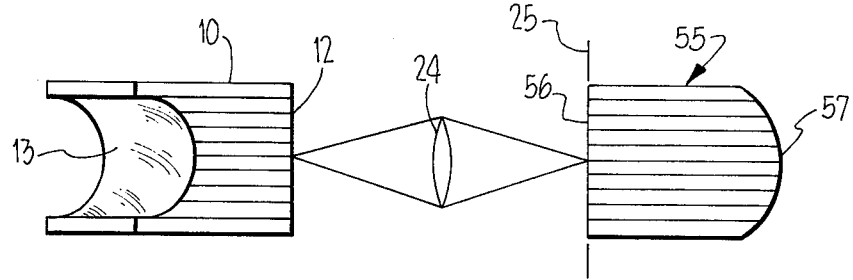
*Fig_13*
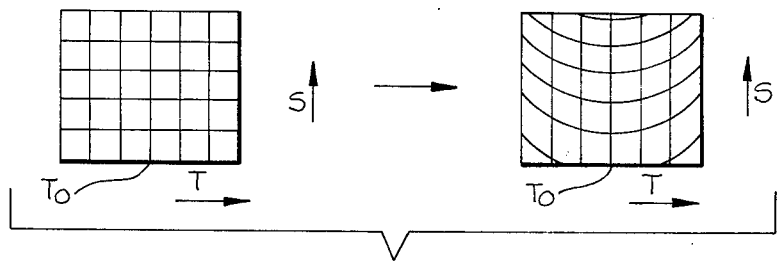
*Fig_14*
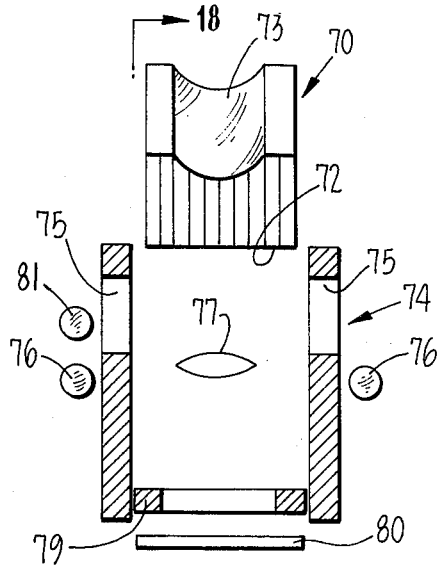
*Fig_17*
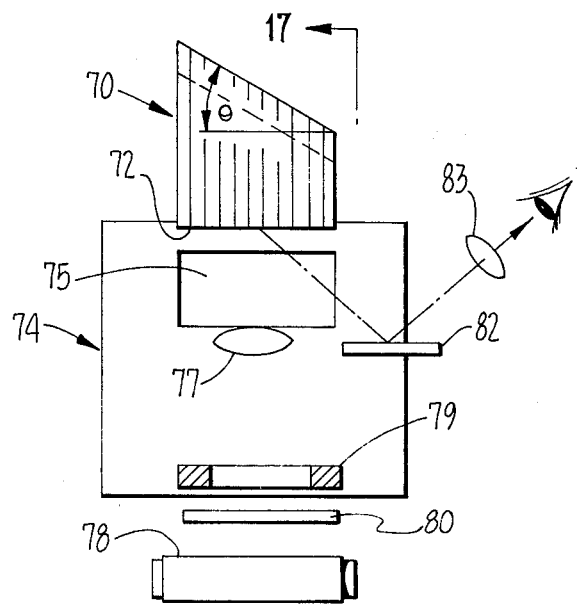
*Fig_18*

APPARATUS FOR PRODUCING A HIGH CONTRAST VISIBLE IMAGE FROM AN OBJECT

BACKGROUND OF THE INVENTION

This invention relates to the generation of high contrast visible images of an object. More particularly, this invention relates to generation of images of this type by means of an optical imaging block having an angled objective surface.

Systems are known which utilize an optical imaging block having an angled objective surface to generate a high contrast visible image of an object. In typical known systems, visible light is transmitted from a light source to the interior of a prism through a planar entry face thereof. The prism is provided with an angled planar objective surface, the angle usually being 45°. The incident light travelling in the prism interior from the entry face is arranged to strike the angled objective surface at an angle greater than the critical angle so that all light striking the objective surface from within is normally totally internally reflected therefrom. This reflected light propagates to a right angle exit surface of the prism so that the light exits, is collected by a collecting lens, and is transmitted to a follow-on optical device, such as a viewing lens or a camera.

When an object such as a human finger is placed on the objective surface of the prism, those portions of the object in contact with the surface cause a portion of the light striking this surface from within to be optically coupled outside the prism, while the light striking those portions of the surface not in contact with the object propagates in the normal manner. As a result, a high contrast image of the object emerges from the exit surface of the prism, the image exhibiting bright regions corresponding to those portions of the object not in contact with the objective surface and dark regions corresponding to those portions of the object in contact with the objective surface.

Systems of the above type have found limited use in a number of applications, perhaps the most notable of which is in the field of finger printing. When used in a finger printing system, the emerging image of the finger print of a finger in contact with the objective surface of the prism is typically recorded on film. In the standard method of obtaining a permanent record of a persons finger prints the fingers are individually inked and pressed onto a finger print chart. This method is relatively undesirable since the inking process is quite time consuming, the ink employed is difficult to remove from the fingers after the prints have been taken, and slight sliding movement of the finger during contact with the chart surface causes a blurring or smudging of the prints. The optical finger print imaging system requires no ink and can produce finger prints in the short time span consumed by placing a finger on the objective surface and actuating a camera shutter. Accordingly, the optical finger print imaging technique is much more convenient to employ than the standard method of obtaining finger prints.

Optical imaging systems of the above type suffer from the severe limitation, however, that image resolution deteriorates rapidly with increasing distance between the object being imaged and the outer objective surface of the prism. Thus, a solid three-dimensional object produces an acceptable image of only planar or nearly planar regions of the object which are in contact with or extremely close to the objective surface. In the case of a human finger, which is somewhat pliable, an image representing a greater percentage of the total three-dimensional region of interest can be obtained by deforming the finger by pressing it downwardly onto the objective surface. However, since the finger becomes deformed, the image obtained is likewise deformed and therefore does not provide a true planar representation of the finger print region.

The above noted limitation has been partially overcome in some systems by placing a peripheral region of the object of interest on the edge of the objective surface of the prism and thereafter rolling the object across the object surface, a process roughly equivalent to scanning the object. For example, in known optical finger printing systems, the finger, in much the same manner as the technique employed with the standard finger print inking systems, is placed edgewise on an edge of the objective surface and rotated so that the region of interest progressively contacts the objective surface. Alternative systems have been devised in which the finger remains stationary and the prism is rotated in synchronism with a scanning device to produce the same result. Systems using this rolling technique, however, suffer from the disadvantage of the necessity for complex synchronizing and scanning mechanisms required to operate the system effectively. In addition, due to the rolling pressure employed, some deformation of the finger is experienced with the same undesirable results as outlined above. Efforts to eliminate the above noted disadvantages have not met with wide success to date.

SUMMARY OF THE INVENTION

The invention comprises a method and apparatus for providing a high contrast visible image from an object of interest which eliminates the above noted disadvantages, produces high quality wide angle images and is exceedingly simple to use. The method employs a fibre-optic imaging block having a partially cylindrical, angled objective surface and a common light entry and exit surface. Light from a source is directed interior of the imaging block via the common surface and travels toward the objective surface along the individual fibres of the block. When an object to be viewed is placed on the objective surface, a high contrast, visible image of the object is produced which exits via the common surface. The partial cylindrical configuration of the objective viewing surface provides a wide imaging angle, defined by the sector angle of the objective surface, enabling the production of an image of a substantially greater portion of the object than heretofore obtainable.

A correction slug is optionally provided for removing distortions introduced by the angle of the cylindrical surface and the cylindrical surface, per se. In an alternate embodiment of the imaging block, the upper portion of the block is distorted so that the individual fibre ends are tangent to the partially cylindrical objective surface in order to eliminate lateral field distortions introduced thereby.

In another aspect of the invention, a finger print imaging system is provided in which the imaging block is used in combination with a flash lamp and viewing optics to provide a high contrast projected image of a finger print which is focused onto a recording or image transmitting medium. Means are further provided for viewing the image before recording. Provision is also made for including distortion correction slugs in conjunction with the finger printing system.

For a fuller understanding of the nature and advantages of the invention, reference should be had to the following detailed description taken in conjunction with the accompanying drawings.

BRIEF DESCRIPTION OF THE DRAWINGS

FIG. 1 is a perspective view of a first embodiment of the optical imaging block;

FIG. 2 is an enlarged partial sectional view taken along lines 2—2 showing details of the block of FIG. 1;

FIG. 3 is a view of the block of FIG. 1 showing a bottom plan image of a finger print;

FIG. 4 is a perspective view of an alternate embodiment of the imaging block;

FIGS. 5-8 are schematic views illustrating fabrication techniques for manufacturing the imaging blocks;

FIGS. 9-11 illustrate inclined plane distortion correction techniques;

FIGS. 12-16 illustrate field flatness and line curvature distortion eliminating techniques;

FIG. 17 is a sectional schematic view taken along lines 17—17 of FIG. 18 of an optical finger printing system constructed according to the invention; and FIG. 18 is a sectional view taken along lines 18—18 of the system of FIG. 17.

DESCRIPTION OF THE PREFERRED EMBODIMENTS

Turning now to the drawings, FIG. 1 shows a perspective view of a first embodiment of an optical imaging block constructed according to the invention. Block 10 has a generally rectangular body configuration with a planar bottom surface 12 and a concave upper objective surface 13. In the FIG. 1 embodiment, concave surface 13 is substantially cylindrical with a radius R, the axis of the surface being inclined with respect to planar surface 12 at an angle $\theta$. As indicated schematically by vertical lines 14, imaging block 10 is fabricated from a fibre-optics boule, the construction being shown in detail in FIG. 2. As shown in this Fig., imaging block 10 is composed of a plurality of individual glass fibres 15 each surrounded by a cladding material 16. Interspersed between adjacent claddings 16 is an extramural absorption material 17. Imaging block 10 is fabricated by grinding cylindrical upper face 13 inclined at the angle on a fibre-optics boule, and polishing faces 12 and 13.

When an object having ridges and valleys or crests and troughs, such as a human finger 20 indicated in phantom in FIG. 1 and shown in section in FIG. 2, is placed on the objective surface 13 of block 10, and block 10 is illuminated from below by a suitable light source 22, a high contrast real image 23 shown in FIG. 3, of the object surface is produced. Image 23 corresponds to the ridges in surface contact with fibres 15 and the valleys which are spaced from other fibres 15. The contrast ratio of the image produced is dependent upon the intensity of the light incident to lower surface 12, the critical angle of glass fibres 15, the numerical aperture NA of the individual fibres and surrounding structure = $\sqrt{n_1^2 - n_2^2}$, where $n_1$ and $n_2$ are the refractive indices of glass fibre 15 and cladding 16, respectively, and the angle of inclination $\theta$ between the axis of concave object surface 13 and planar surface 12. Thus, given a standard light source 22 and a boule of a particular construction, the contrast ratio of the image is optimized by varying the angle $\theta$. For most commercially available boules of standard construction, and a cylindrical object surface 13, the optimum angle of inclination $\theta$ lies in the range from about 35° to about 45°. For example, with optical imaging blocks fabricated from Corning 7056 cladding glass and OTI DBF 69 core glass having a numerical aperture of 0.79, the optimum value for the angle $\theta$ was found to be about 40°.

The magnitude of the radius R of cylindrical object surface 13 is dependent upon the nature of the object being imaged. For example, in the finger printing apparatus described below, a radius R equal to 0.44 inch is used which has been found optimal in physically accomodating the average human finger as determined from available statistics. If desired, other values of R may be employed with equivalent results.

As will be apparent to those skilled in the art, the concave object surface 13 of imaging block 10 provides a broad viewing angle $\phi$ for curved or deformable objects of interest, the upper limit on the value of $\phi$ being approximately 120°. Thus, curved or deformable objects having surfaces of interest lying in this angular range can be imaged by merely placing the object on surface 13 and illuminating block 10 from below. If desired, the emerging real image may be focused by means of a lens 24 onto a focal plane 25 and viewed directly. Similarly, a photographic film or a light-sensitive image transmission device may be positioned at focal plane 25 for image recording purposes.

In some applications, it is desirable to provide an imaging block 10 having a viewing angle $\phi$ greater than that afforded by the FIG. 1 embodiment. FIG. 4 illustrates an imaging block 30 capable of providing an expanded viewing angle $\phi$.

In the FIG. 4 embodiment, imaging block 30 has a planar light input/image output face 31 and a cylindrical objective surface 33 inclined at an angle $\theta$ with respect to face 31. The upper portion 32 of the individual fibres are bent inwardly toward cylindrical surface 33. Ideally, this bending is confined to the T-plane so that the axis of each fibre in a common plane along the T-axis, i.e., a plane normal to the projection of the axis of cylindrical surface 33 onto planar face 31, is normal to the curve formed by the intersection of that plane with cylindrical surface 33. This condition is ideally met for all vertical planes parallel to the T-axis. In actual practice, up to about 10° bending of coplanar fibres out of their respective common plane can be tolerated without seriously degrading the contrast of the resulting image. Optical imaging blocks 30 constructed in this manner, have been found to provide a viewing angle $\phi$ in excess of 150°.

FIGS. 5 and 6 schematically illustrate a first method of fabricating optical imaging block 30. A standard optical boule 35 is first provided with a V-shaped trough 36 having planar shoulders 37, trough 36 being cut at an angle $\theta$ selected in accordance with the above discussed criteria. After forming the upper surface of boule 35 in this manner, the upper portion of boule 35 is heated to a temperature at which the structure is readily deformable and placed in a suitable jig, after which pressure is applied toward the center of the boule 35 as indicated by arrows 38. After the upper portion of boule 35 has been deformed to the shape illustrated in FIG. 6, the partially formed block is cooled, after which cylindrical surface 33, indicated in broken lines in FIG. 6, is ground to the desired radius R and polished.

FIGS. 7 and 8 illustrate another method of fabricating imaging block 30 in which a pair of blocks 30 may be preformed with a single step. According to this method a standard optical boule 40 having planar end surfaces 41, 42 is first drilled to remove a central portion indicated by broken lines 43. During the drilling step, the drilling tool is angled so that the resulting cylindrical bore is formed at the angle θ with planar surfaces 41, 42. After drilling, the boule is heated to a deformable temperature and pressed in the direction of arrows 44, 45 by means of a pair of mandrels 46, 47 to deform the central portion thereof. After deformation, the partially formed block is sliced centrally thereof to provide a pair of blocks 40' of the type shown in FIG. 8. After cooling, cylindrical surface 33, shown in broken lines in FIG. 8 is ground and polished to the desired radius R.

As noted above, optical imaging blocks 10 and 30 each provide a high contrast object imaging capability with a broad viewing angle φ. However, images produced by both embodiments contain residual distortions introduced by the geometry of the blocks. In some applications, these distortions may be of no consequence and the images may be recorded or viewed directly. In other applications, it is desirable to eliminate the residual distortions. This may be accomplished as follows.

The distortions introduced by the geometry of optical imaging blocks 10, 30 are two fold: viz., inclined plane distortions and field flatness distortions. With reference to FIG. 1, due to the inclination of object surface 13 with respect to surface 12, an inclined plane distortion is introduced into an image 23 produced by block 10. As shown in FIG. 9, if a square grid were placed on a planar object surface inclined at an angle θ with respect to surface 12, the resulting image would exhibit a linear uniform compression in the S direction. FIG. 10 illustrates a first arrangement for eliminating this distortion. In this Fig., an optical correction block 50 has a planar light inlet surface 51 and a planar outlet surface 52 formed at the same angle with respect to surface 51 as the angle θ between object surface 13 and planar surface 12 of optical imaging block 10. Block 50 is positioned so that surface 51 is coplanar with focal plane 25.

FIG. 11 illustrates an alternate arrangement for removing the inclined plane distortion from an image. In this arrangement, optical imaging block 10' is provided with a planar face 12' describing an angle $\theta_2$ with a plane normal to the sidewalls of block 10'. Correction block 50' is provided with a planar light inlet surface 51' normal to the axes of the glass fibres and a planar outlet face 52' describing an angle $\theta_3$ with inlet face 51'. The angles $\theta_1$, $\theta_2$ and $\theta_3$ are selected to satisfy the relation $\cos\theta_1 = \cos\theta_2 \cos\theta_3$.

In addition to the inclined plane distortion introduced by the angle of inclination of the object surface 13, the concave cylindrical shape of object surface 13 introduces an additional field flatness distortion illustrated in FIG. 12. With reference to FIG. 12, if a grid pattern of similar squares were placed on a cylindrical object surface inclined at an angle θ with respect to surface 12, the resulting image would exhibit an increasing compression with distance T from the center $T_o$ of the image to the edges. This compression is due to the fact that the fibre assemblies 14 are all arranged in vertical planes so that the ends of the fibres are cut at an increasingly greater angle by a cylinder of radius R as the magnitude of the distance T increases. In addition, the horizontal grid lines become curved as shown due to the inclination of surface 13.

FIG. 13 illustrates an optical correction block 55 designed to remove the field flatness distortion provided by optical imaging block 10. As shown in this Fig., correction block 55 is provided with a planar surface 56 positioned coplanarly with focal plane 25 and a cylindrical face 57 having a radius of curvature equal to the radius of curvature of cylindrical surface 13 of FIG. 1.

FIG. 14 illustrates the field flatness distortion introduced by optical imaging block 30. Since end 32 of the fibres comprising block 30 are curved towards cylindrical surface 33 in such a manner that the axis of each fibre lying in a common plane normal to the projection of the axis of cylindrical surface 33 onto planar face 31 is normal to the intersection of the plane with cylindrical surface 33, no image compression is exhibited along the T axis. However, due to the inclination of surface 33 with respect to bottom surface 31, the horizontal grid lines are curved as shown in FIG. 14.

FIGS. 15 and 16 illustrate an optical correction block 60 designed to remove the field flatness distortion introduced by optical imaging block 30. As illustrated, correction block 60 is provided with a planar light inlet face 61 coplanarly arranged with focal plane 25 and a curved planar light outlet face 62. As best shown in FIG. 16, outlet face 62 is curved in such a manner that individual fibre planes are mutually parallel and increasingly displaced in the S direction with increasing distance from $T_o$, the curvature of face 62 in the T-S plane being a function of the angle of inclination θ and the radius R of cylindrical surface 33.

In some applications, it may be desirable to remove only some of the distortions introduced by the configuration of imaging blocks 10, 30. For example, if only the inclined plane distortion is to be removed, a correction block of the type illustrated in FIG. 10 or a combination of a modified optical imaging block 10' and a correction block 50' of the type illustrated in FIG. 11 may be employed. Likewise, if only the field flatness distortion is to be removed from an image produced by imaging blocks 10 or 30, a correction block of the type illustrated in FIGS. 13 or 15, 16 may be used. As will be apparent to those skilled in the art, both types of distortion may be removed by a combination of the various arrangements. Alternatively, both types of correction may be incorporated into a single correction block, for example, one having a planar light inlet face and a cylindrical light outlet face, the cylinder being inclined with respect to the inlet face by the angle θ.

FIGS. 17 and 18 illustrate an optical finger printing system utilizing one or more of the optical imaging blocks described above. An optical imaging block 70 having a common light entry/exit planar surface 72 and a cylindrical object surface 73 inclined at an angle θ with respect to surface 72 is mounted above a housing 74. Housing 74 is provided with a pair of sidewall apertures 75 which permit light from a pair of illuminating flash lamps 76 to illuminate bottom surface 72. A focusing lens 77 is mounted interior to housing 74 and serves to focus the image emerging from the bottom surface 72 onto a film strip 78 via a shutter 79 and a light filter 80. A viewing lamp 81, reflecting mirror 82 and an objective eyepiece lens 83 are also provided to permit an operator to view the image before recording on film 78. In the preferred embodiment, flash lamps 76 each comprise a Model 422 flash lamp supplied by ILC company of Sunnyvale, California, shutter 79 is a conventional self-cocking synchronous shutter which generates a trigger signal for flash lamps 76, filter 80 is a conventional narrow band green filter, and lens 77 is a commercially available 50 mm focal length $f/4$ Schneider Componon lens working at a $f/5.6$ stop.

In operation, a finger is placed onto surface 73 and bottom surface 72 is illuminated by viewing lamp 81. The resulting image is viewed via mirrors 82 and lens 83 and, when found satisfactory, flash lamps 76 are actuated along with shutter 79 to expose film 78. The film is then advanced by means not shown and the next finger placed on surface 73. If desired, a plurality of imaging blocks 70 may be provided to permit simultaneous recording of the images of a plurality of finger prints. In addition, one or more of the correction blocks described above may be provided in the path of the image to eliminate the inclined plane and field flatness distortions described above.

Optical imaging systems constructed in accordance with the invention disclosed herein provide a high contrast image of objects with ridges and valleys which exhibits substantially less variable distortion than images produced by known devices. In addition, images obtained with devices constructed in accordance with the teachings of the invention possess superior resolution to images generated by known devices. It is further noted that the resolution of imaging blocks 10, 30 can be increased by increasing the number of fibres 15 per unit area, if desired. A further advantage of the invention resides in the elimination of the requirement found in prior art systems of providing an intermediate hard copy of the image before recording the image in final form. For example, in inking type finger printing systems, a set of inked finger prints must first be produced, from which the final image is recorded by way of a camera at the finger printing site, or by way of an image transmission device and a recording device at a remote site. Finger printing systems constructed according to the invention generate a real high contrast image which, as noted above, can be directly transmitted by a facsimile transmission device to a central record keeping location.

While the above provides a complete and adequate disclosure of the preferred embodiment of the invention, various modifications, alternate constructions and equivalents may be employed without departing from the true spirit and scope of the invention. For example, concave surfaces 13 and 33 need not be cylindrical in shape, but may be ground to other configurations, such as parabolic, hyperbolic or elliptical. Accordingly, the above description and illustrations should not be construed as limiting the scope of the invention which is defined by the appended claims.

What is claimed is:

1. An optical imaging device for producing a high contrast image from an object having ridges and valleys, said device comprising:
   a fibre optics block comprising a plurality of substantially parallel individual fibres, said block having a planar light input/image output face and an objective surface for surface contact with said ridges of said object, said objective surface being inclined at an angle $\theta$ with respect to said planar face, where $\theta$ is an angle $< 90°$, said fibres extending in a direction substantially normal to said planar face.

2. The device of claim 1, wherein said objective surface is concave.

3. The device of claim 2, wherein said concave surface is cylindrical.

4. The device of claim 3, wherein said concave cylindrical surface is inclined at an angle $\theta$ lying in the range from about 35° to about 45°.

5. The device of claim 3, wherein the axis of each said fibre lying in a common plane normal to the projection of the axis of said cylindrical surface onto said planar face is substantially normal to the curve formed by the intersection of said plane with said cylindrical surface.

6. An optical imaging system for producing a distortion compensated high contrast image from an object having ridges and valleys, said system comprising:
   a fibre optics imaging block comprising a plurality of substantially parallel individual fibres, said block having a planar light input/image output face and an objective surface for receiving said object, said objective surface being inclined at an angle $\theta$ with respect to said planar face, where $\theta$ is an angle $< 90°$;
   means for illuminating said planar face;
   means for projecting the image emerging from said face onto a focal plane; and
   a correction device for removing distortions from said projected image, said device comprising a fibre optics block having a plurality of substantially parallel individual fibres, a substantially planar image input face positioned substantially coplanarly with said focal plane, and an output face inclined at an angle $\gamma$ with said image input face, said fibres of said correction device fibre optics block extending in a direction substantially normal to said planar image input face.

7. The system of claim 6, wherein said angle $\gamma$ equals said angle $\theta$.

8. The system of claim 6, wherein said planar face of said imaging block is inclined at an angle $\theta_2$ with respect to a plane substantially normal to said imaging block fibres; and said angles are selected so that $\cos \theta = \cos \theta_2 \cos \gamma$.

9. The system of claim 6, wherein said objective surface of said imaging block is concave, and said output face of said correction device is curved with substantially identical curvature to said objective surface.

10. The system of claim 9, wherein said objective surface of said imaging block is cylindrically concave and said output face of said correction device is cylindrically convex.

11. The system of claim 6, wherein said objective surface of said imaging block is cylindrically concave and the axis of each said fibre lying in a common plane normal to the projection of the axis of said cylindrically concave surface onto said planar light input/image output face is substantially normal to the curve formed by the intersection of said plane with said surface, and wherein said individual fibres of said correction device are arranged in planes parallel to the axis of said cylindrically concave objective surface, adjacent ones of said planes being progressively displaced in a first direction with increasing distance along a second direction from a central reference $T_o$, said first and second directions being substantially normal to said correction device fibres.

12. A system for generating a high contrast image of a finger print, said system comprising:
   an imaging block, comprising a plurality of substantially parallel individual fibres, said block having a planar light input/image output face and an objective surface adapted to be contacted by the ridges of said finger print, said objective surface being inclined at an angle $\theta$ with respect to said planar face, where $\theta$ is an angle $< 90°$, said fibres extending in a direction substantially normal to said planar face;
   flash lamp means for illuminating said planar face; and
   means for projecting the resultant image from said face onto a focal plane.

13. The system of claim 12, wherein said objective surface is concave.

14. The system of claim 13, wherein said concave surface is cylindrical.

15. The system of claim 14, wherein said concave cylindrical surface is inclined at an angle $\theta$ lying in the range of from about 35° to about 45°.

16. The system of claim 14 wherein the axis of each said fibre lying in a common plane normal to the projection of the axis of said cylindrical surface onto said planar face is substantially normal to the curve formed by the intersection of said plane with said cylindrical surface.

17. The system of claim 12 further including means for recording said projected image.

18. The system of claim 12, wherein said projecting means includes a focusing lens and a shutter.

19. The system of claim 18, wherein said projecting means further includes a light filter interposed in the path of said projective image.

20. The system of claim 12, further including viewing means for inspecting the image before recording.

21. The system of claim 20, wherein said viewing means includes a mirror and an objective lens.

* * * * *